3,394,873
METHOD AND APPARATUS FOR CONTROLLING
COMPRESSOR UNITS AND THE LIKE
Herbert E. Reese and Robert C. Bracken, Bartlesville,
Okla., assignors to Phillips Petroleum Company, a corporation of Delaware
Filed Mar. 21, 1966, Ser. No. 536,014
10 Claims. (Cl. 230—4)

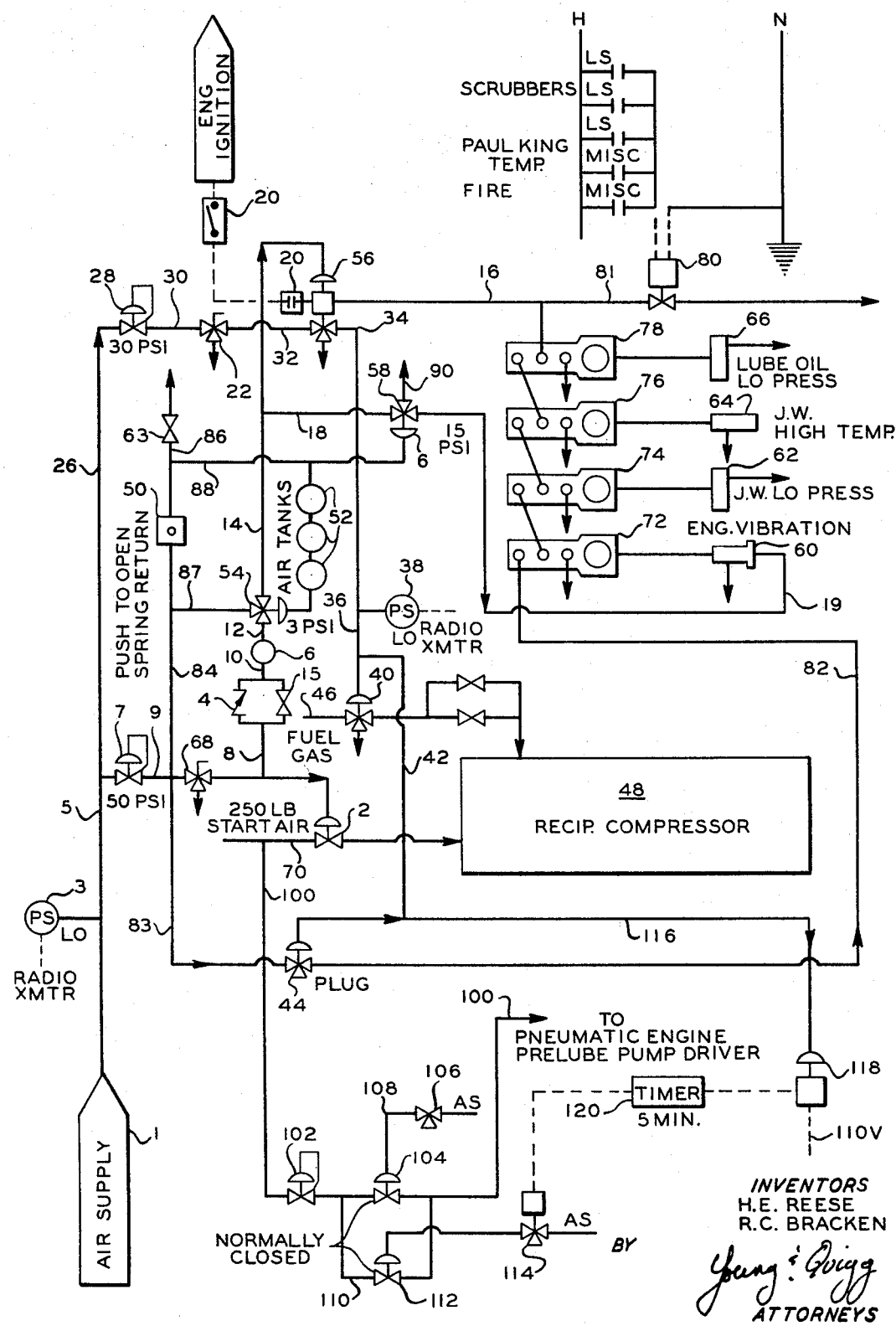

ABSTRACT OF THE DISCLOSURE

An automatic control system for a compressor unit which includes a pneumatic system for actuating a valve system which controls spark and fuel to the compressor engine during engine startup, and a safety relay system adapted to maintain actuation of the valve system during engine operation while the engine is functioning properly, but to deactuate the valve system when an engine malfunction occurs is equipped with a pneumatic relay check system which allows the valve system to remain actuated during engine operation while the safety relay system is being checked and thereby triggered in a manner that would ordinarily deactuate the valve system.

---

This invention relates to controlling compressor units and the like. In one of its aspects, it relates to a method for checking safety controls on a safety shutdown system which maintains a compression engine operating, in which a pressure system is used to maintain the engine in operating condition, the safety system is integrally connected to the pressure system to control shutdown of the engine, the method comprising maintaining pressure in the pressure system for a predetermined period of time while voiding the pressure in the safety relay system so that safety devices can be checked without necessity of closing down the engine. In another of its aspects, the invention relates to a method for checking safety controls on a safety shutdown system as hereinbefore described wherein the pressure system is returned to its initial operating condition automatically by means of a pneumatic time delay system integrally and operably connected to the safety relay system. In another of its aspects, the invention relates to a method for controlling a compression engine as hereinbefore described wherein an auxiliary lubrication pump is actuated for a predetermined period of time when the engine is shut down.

In another of its aspects, the invention relates to an apparatus for controlling a compressor driven by a fuel-fired engine comprising a pneumatic means for maintaining said engine operating, a safety relay system adapted to close down the engine when a malfunction occurs, a means for maintaining pressure in the pneumatic engine maintaining means while simultaneously voiding pressure in the safety relay system, and means for returning the relay system back to normal operating condition after a predetermined period of time. In another of its aspects, the invention relates to an apparatus as hereinbefore described wherein a fluid pressure delay system is used for maintaining and restoring the pressure to the system. In a still further aspect, the invention relates to an apparatus as hereinbefore described wherein there is further provided a means for actuating an auxiliary pump to supply lubrication to the engine bearings when the engine is shut down.

Control systems for engine compressors and the like are well known. The control systems are constructed so as to sense malfunctioning conditions such as an electrical failure, lubrication oil low pressure, cooling water high temperature, cooling water low pressure, and engine vibrations. When any malfunction occurs, the control system operates to close down the engine.

It is desirable to periodically examine the sensing devices and associated relay devices which shut down the engine in the event of malfunction. Obviously, it is desirable to check the devices without shutting down the engine. Heretofore, safety control systems have been so constructed as to provide dual parallel sensing and control devices so that one device in one line can be closed off from the system and checked while the engine is maintained operating.

I have now discovered that safety devices can be checked without the need for parallel dual safety devices by maintaining the pressure in the system which controls the feeding of fuel and the like to the engine, and voiding the pressure in the sensing and relay devices for a predetermined length of time so that they can be checked. A pneumatic delay system can be used to automatically switch the system back to normal operating conditions.

By various aspects of this invention, one or more of the following or other objects can be obtained.

It is an object of this invention to provide a simple system for checking safety relays without shutting the engine down.

It is a further object of this invention to provide a system for automatically providing lubricant for turbo-charged compressors in the event of engine shutdown without requiring the main engine connected pump to be used.

It is a still further object of this invention to provide an automatic restoration system for checking safety relays without engine shutdown.

It is a still further object of this invention to provide a single unit for checking a plurality of safety relays without engine shutdown.

Other aspects, objects, and the several advantages of this invention are apparent to one skilled in the art from a study of this disclosure, the drawings, and the appended claims.

According to the invention, there is provided a pneumatic system for checking safety relays in an automatic shutdown system for a compressor unit. If the relays are actuated by a malfunction, air will be bled from the lines which control the feeding of fuel to a compressor unit. The invention resides in maintaining air in the lines which control feeding of fuel to the compressor, while bleeding air from the relay lines. The relays can then be synthetically checked, preferably manually, to ascertain their ability to perform. At the end of a preselected period of time, air returns to the relays and the system automatically returns to normal operating conditions.

According to another embodiment of the invention, an integral system is provided for maintaining lubrication pressure in the bearings of a turbo-charger until sufficient time has elapsed after engine shutdown, such that lubrication is no longer needed. When the valve controlling fuel supply to the engine is closed, the means which actuate the valve also actuate the valve in the auxiliary pump line to commence operation of the auxiliary pump which supplies lubrication to the bearings. The stopping of the engine will cause the main pump to stop. After a predetermined length of time, the auxiliary lubricating pump will automatically be stopped.

The invention will now be described with reference to the drawing which schematically shows an embodiment of the invention.

Referring now to the drawing, a compressor unit 48 which is driven by a fuel burning engine to which fuel is supplied through line 46 is provided. An ignition system operates when switch 20 is closed. A series of sensing devices 60, 62, 64 and 66 which sense respectively engine vibration, jacket water low pressure, jacket water high temperature, and lube oil low pressure, for example, actuate relays 72, 74, 76 and 78. Relays 72, 74, 76 and 78 can be any known type of relay such as the Amot Pneumatic Indicating Relay, No. 2400D, distributed by the Amot Controls Corporation, Richmond, Calif.

To start the engine, valves 68 and valves 22 are opened to allow air pressure from supply 1 to pass through line 5, line 9, through valve 68 to apply pressure to valve head 2 which is biased closed. The pressure on valve head 2 will open it up to allow air to pass therethrough to allow the engine to turn over. Air pressure simultaneously passes through line 8, valve 4, air pressure tank 6, valve 54, which is biased opened, line 14 to the top of valve 56. Valve 56 can be any control valve known in the art, such as the Amot Safety Control, No. 1476B-A½ and -A1 distributed by Amot Controls Corporation, Richmond, Calif. The pressure at the top of valve 56 will cause it to open allowing air pressure to pass through lines 26, valve 28, line 30, valve 22, line 32, valve 56, line 34, line 36, to apply pressure to the top of valve 40 which is normally biased closed.

The pressure applied to the head of valve 40 opens line 46 to allow fuel to pass into the engine. The opening of valve 56 also actuates switch 20 to close so that an electrical spark is provided in the engine to burn the fuel. The air pressure also passes through line 42 to valve 44 which is normally biased closed. The pressure applied to the top of valve 44 opens line 83 and allows air pressure to pass therethrough through line 82 to relays 72, 74, 76 and 78 when they have shifted to the left. The shift to the left of the relays allows pressure to pass through the relays into line 16, which pressure in line 16 locks valve 56 in the open position. Valve 80 in line 81 is normally closed. However, in the event that an electrical malfunction occurs, valve 80 will open to allow fluid pressure to vent through line 81.

Fluid pressure also passes through line 18, through valve 58 which is biased open, and line 19. The pressure in line 19 cocks sensing means 60, which in turn, causes the relay 72 to move to the left allowing air passage therethrough. Sensing devices 62, 64 and 66 are self cocking under normal operating conditions. Although four relays and four mechanical sensing devices have been schematically illustrated, it is obvious that more or less sensing devices and relays can be used.

An auxiliary lubrication pump is used to provide lubrication to the engine prior to the time when the engine is operating satisfactorily enough to drive its own lubrication pump. Air pressure passing through line 100, valve 102, supplies the motive power for the auxiliary lubrication pump. Valve 106 is manually opened to allow pressure to pass through line 108 to the head of valve 104 which is normally biased closed. The pressure applied to the head of valve 104 opens it and allows the pressure to be supplied to the pneumatic pump. After the engine is operating adequately, valve 106 is closed to vent the pressure in line 108 and close the valve 104 which causes the auxiliary pump to cease operation.

When the engine begins to operate and the pressure has been supplied through line 16 to valve 56 to lock it open, the pressure in line 14 is released. A bleeder valve 15 bleeds the pressure from line 10. Further, after initial startup, valve 68 is closed, venting the air in the head of valve 2, thus shutting down that valve to discontinue the air supply 70.

In the event of a malfunction such as, for example, excessive engine vibration, sensing means 60 actuates relay 72 which moves to the right, thus voiding pressure in line 16. The release of pressure in line 16 will cause switch 20 to open, cause valve 56 to close, thereby venting pressure in line 34. The voiding of pressure in line 34 voids pressure in line 36 and line 42 which in turn close down valves 40 and 44 respectively. The closing of valve 40 shuts off the fuel supply to the engine, and the shutting of valve 44 shuts the air supply to relays 72, 74, 76 and 78. When the pressure in line 34 is voided, a pressure sensor 38 is provided to transmit a signal to a maintenance center. Similarly, malfunction sensed by sensing devices 62, 64 and 66 causes associated relays 74, 76 and 78 to move to the right, thus voiding pressure in line 16. Since the system depends on an adequate fluid pressure source, there is provided a pressure sensor 3 which will send a signal to a maintenance station in the event that the air supply 1 should fail.

Any electrical malfunction will cause valve 80 to open, thus venting pressure in line 81, voiding pressure in line 16, which in turn closes down the engine as hereinbefore described.

In the event of an engine shutdown, fluid pressure in line 116 is also voided, which voiding releases the pressure on valve 118. The loss of pressure on valve 118 actuates timer 120 which in turn actuates valve 114 to supply air to the top portion of valve 112. Valve 112, normally closed, is opened by the pressure supplied to the head thereof, and allows air pressure to pass through line 110 so that air pressure is supplied to the auxiliary engine pump to supply lubricant to the bearings therein to prevent damage to them. After a predetermined period of time, for example five minutes, the valve 114 is actuated to close off air pressure to the top of valve 112 thereby closing valve 12 and shutting off pressure to the auxiliary lubrication pump.

The checking system operates as follows: A push button switch 50 is manually actuated to allow pressure to flow through line 84, through switch 50, through line 88, into air tanks 52; air pressure in tanks 52 supplies pressure to the top of valve 54, thereby allowing air pressure in line 87 to pass through line 14 to the top of valve 56, thus holding valve 56 open. Air pressure also passes through line 88. This allows sensing means 60, 62, 64 and 66 and their associated relays 72, 74, 76 and 78 to be checked without closing down the engine. An adjustable slow bleed valve 63 is provided in line 86 which slowly bleeds air from air tanks 52. As the air is bled from air tanks 52, valve 58 repositions and voids line 19. Air pressure will be maintained in relays 72, 74, 76 and 78. Thus, after a predetermined period of time, depending on the aperture in the bleed valve 63, the checking system automatically switches back to the normal operating system.

By the use of the invention which automatically returns the system to automatic control, $5,000 to $10,000 is saved. Without the use of the invention, in the event that the system is left on manual, the automatic controls will not function, and that amount of damage could be done to the unit. If the unit is damaged, it would necessitate shutdown for repair and would result in considerable loss of production.

Reasonable variation and modification are possible within the scope of the foregoing disclosure, the drawings, and the claims to the invention, the essence of which is that there has been provided a method and means for automatically checking safety relays in a pneumatic control system whereby the pressure in the safety control lines is maintained while the pressure in safety relays is released so that checking can take place and the system is restored to operating conditions automatically; and there has been provided a method and means for preventing damage to bearings of a turbo-charger in the event of engine shutdown, whereby an auxiliary lubrication pneumatic pump is automatically actuated to deliver lubrication to essential parts when such engine shutdown occurs.

We claim:

1. An automatic control system for a compressor unit comprising:
   (a) a compressor driven by a fuel-fired engine;
   (b) fuel supply means to supply fuel to said engine;
   (c) electrical charge means to spark said engine;
   (d) switch means to control said electrical charge means;
   (e) pneumatic means for maintaining said engine in operating condition by actuating said fuel supply means and said switch means;
   (f) a safety relay system adapted to supply positive pneumatic pressure and thereby lock said pneumatic means in a position for said actuating when said engine is operating properly, and to void pressure from said pneumatic means and thereby deactuate said fuel supply means and said switch means to thereby close down said engine when a malfunction occurs; and
   (g) means for maintaining pressure in said engine maintaining pneumatic means while simultaneously voiding pressure in said safety relay system during continuous engine operation, said means for maintaining pressure adapted to automatically return pressure to said safety relay system after a predetermined period of time.

2. An apparatus according to claim 1 wherein a fluid pressure delay system is used for automatically restoring fluid pressure to said system.

3. An apparatus according to claim 2 wherein there is provided a first valve means on said fuel supply means, said pneumatic means for maintaining said engine in operating condition comprises:
   (a) a first conduit means to maintain pressure on said fuel supply first valve means;
   (b) second valve means on said first conduit means adapted to allow pressure to pass therethrough when open and adapted to bleed pressure from said first conduit means on said first valve means side, said second valve means being normally biased closed;
   (c) second conduit means adapted to supply pressure to said second valve means to actuate said second valve means to open position;
   (d) third conduit means associated with said second valve means to supply pressure to a locking means associated with said second valve means to lock said second valve means in open position when fluid pressure is supplied to said locking means;
   (e) means associated with said second valve means to maintain said switch means in closed position when said second valve means is in open position, said means associated with said second valve means also adapted to open said switch means when said second valve means is in closed position.

4. An apparatus according to claim 3 wherein said safety relay system comprises:
   (a) at least one sensing means to sense a mechanical or thermal malfunction;
   (b) relay means operably connected to said sensing means;
   (c) fourth conduit means for supplying pressure to said relays, said relay means adapted to pass pressure therethrough when there is no malfunction;
   (d) third valve means biased closed associated with said fourth conduit means for allowing pressure to pass through said fourth conduit means when said third valve means is open;
   (e) fifth conduit means associated with said first conduit means to supply pressure to the head of said third valve means to open said third valve means;
   (f) sixth conduit means operably connected to said relay means and said third conduit means to supply fluid pressure from said relay means to said locking means;
   (g) seventh conduit means associated with said sixth conduit means to vent pressure in said sixth conduit means;
   (h) fourth valve means associated with said seventh conduit means; and
   (i) means associated with said fourth valve means to maintain said fourth valve means closed in normal operation, but to open said fourth valve in event of an electrical malfunction.

5. An apparatus according to claim 2 wherein said means for maintaining pressure in said engine maintaining pneumatic means comprises:
   (a) means for supplying pressure to said second conduit means;
      (1) a fifth valve means biased open in a first position associated with said second conduit means adapted to pass pressure therethrough to said second conduit means;
      (2) eighth conduit means to supply fluid pressure to said fifth valve head to switch it to a second position;
      (3) ninth conduit means to supply pressure through said fifth valve means in second position to said second conduit means to maintain said second valve means in open position;
   (b) pressure storage means associated with said eighth conduit means;
   (c) means to bleed pressure from said storage means at a predetermined rate;
   (d) tenth condit means associated with said relay system;
   (e) sixth valve means associated with said tenth conduit means to regulate fluid pressure passing therethrough, said sixth valve means adapted to vent pressure in said tenth conduit means when closed;
   (f) eleventh conduit means associated with said pressure storage means and operably connected to said sixth valve means head to cause said sixth valve means to close, thus voiding pressure in said relay means, allowing sensing and relay means to be tested while said engine is running.

6. An apparatus according to claim 2 where there is further provided an automatic shutoff post-lube auxiliary pump to supply lubrication to said engine bearings during and after shutdown for a predetermined length of time.

7. An apparatus according to claim 6 where there is provided
   (a) a twelfth conduit means for supplying air to said auxiliary pump to operate the same;
   (b) seventh valve means associated with said twelfth conduit means to control passage of pressure through said twelfth conduit means, said seventh valve means normally biased closed; and
   (c) means for actuating said seventh valve means to open to allow fluid pressure to pass therethrough, said actuating means being operably connected to said first conduit means such that said actuating means is actuated when pressure in said twelfth conduit means is voided, said actuating means including a timer means to close down said seventh valve means after a predetermined length of time.

8. A method for checking safety controls on a safety relay shutdown system in which a pressure system is used to actuate and maintain a compressor engine operating, said safety relay system being integrally connected to said pressure system and adapted to maintain positive pressure to said pressure system when said engine is operating properly and to void pressure from said pressure system when an engine malfunction occurs, the method comprising maintaining pressure is said pressure system for a predetermined period of time while voiding pressure in said safety relay system so that safety relays can be checked without the necessity of closing down said engine.

9. A process according to claim 8 wherein a pneumatic delay system is actuated to maintain the pressure in said pressure system, and to void pressure in said safety relay system, and said pneumatic delay system automatically returning the pressure to the safety relay system after a predetermined period of time.

10. A process according to claim 8 wherein a pneumatic auxiliary pump is started in the event of engine shutdown to supply lubrication to engine bearings for a predetermined period of time.

References Cited

UNITED STATES PATENTS

| | | | |
|---|---|---|---|
| 3,075,537 | 1/1963 | Poster | 137—16 |
| 3,107,693 | 10/1963 | Poster et al. | 137—16 X |
| 3,199,523 | 8/1965 | McEathron | 123—198 X |
| 3,215,534 | 5/1966 | Strecker | 230—13 X |
| 3,216,409 | 11/1965 | Poster | 123—198 X |

WILLIAM L. FREEH, *Primary Examiner*.